United States Patent

[11] 3,595,600

| [72] | Inventor | Gerald K. Stevens<br>c/o P. O. Box 18948, Los Angeles, Calif. 90018 |
|---|---|---|
| [21] | Appl. No | 765,257 |
| [22] | Filed | Oct. 4, 1968<br>Continuation-in-part of Ser. No. 613,927, Feb. 3, 1967, Pat. No. 3,415,539 |
| [45] | Patented | July 27, 1971 |

[54] AXLE EXTENSION APPARATUS FOR WHEELED VEHICLE APPARATUS
13 Claims, 16 Drawing Figs.

| [52] | U.S. Cl. | 280/203, 280/473 |
|---|---|---|
| [51] | Int. Cl. | B62k 27/00 |
| [50] | Field of Search | 280/150, 203, 411, 204, 473 |

[56] References Cited
UNITED STATES PATENTS

| 1,212,350 | 1/1917 | Harley | 280/203 |
|---|---|---|---|
| 1,824,675 | 9/1931 | Linn | 280/203 |
| 1,918,213 | 7/1933 | Pazandak | 280/411 |
| 2,416,731 | 3/1947 | Baldwin | 280/473 |
| 2,973,209 | 2/1961 | Shaw | 280/150 |

Primary Examiner—Kenneth H. Betts

ABSTRACT: The specification discloses axle extension apparatus for wheeled vehicle apparatus which, in one preferred form, may comprise a main wheeled vehicle and an auxiliary wheeled vehicle adapted to be attached so as to have a main axle of the main vehicle transversely substantially coaxially aligned with an extension axle of an auxiliary vehicle for simultaneous rolling movement and in a manner which is substantially rigid in a horizontal plane but provides vertical flexibility so as to allow the two-wheeled vehicles to have a limited extent of relative vertical pivotal movement with respect to each other as they simultaneously ride along an elevationally irregular terrain. In one preferred form, the main vehicle may comprise a tricycle and the auxiliary vehicle may comprise a tricycle sidecar, and connection and coupling frame means may also be provided connecting same together in a manner providing rigidity in a horizontal plane but limited vertical flexibility for the above-mentioned purposes. The apparatus is such a to make it possible to attach such an extension axle and tricycle sidecar to any tricycle either at the time of manufacture or subsequently.

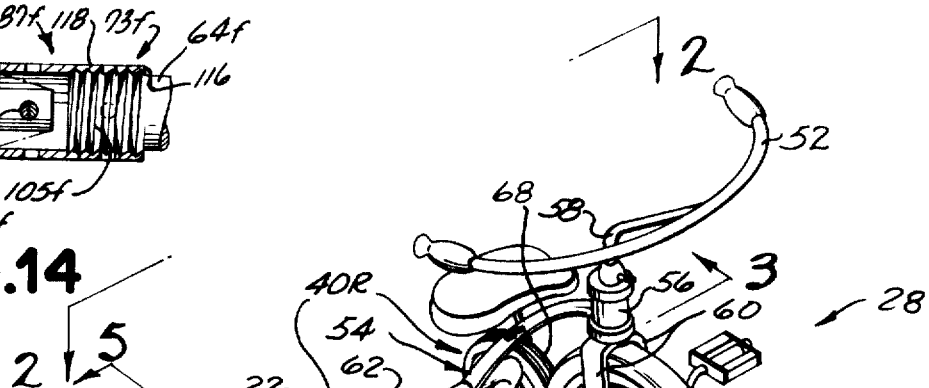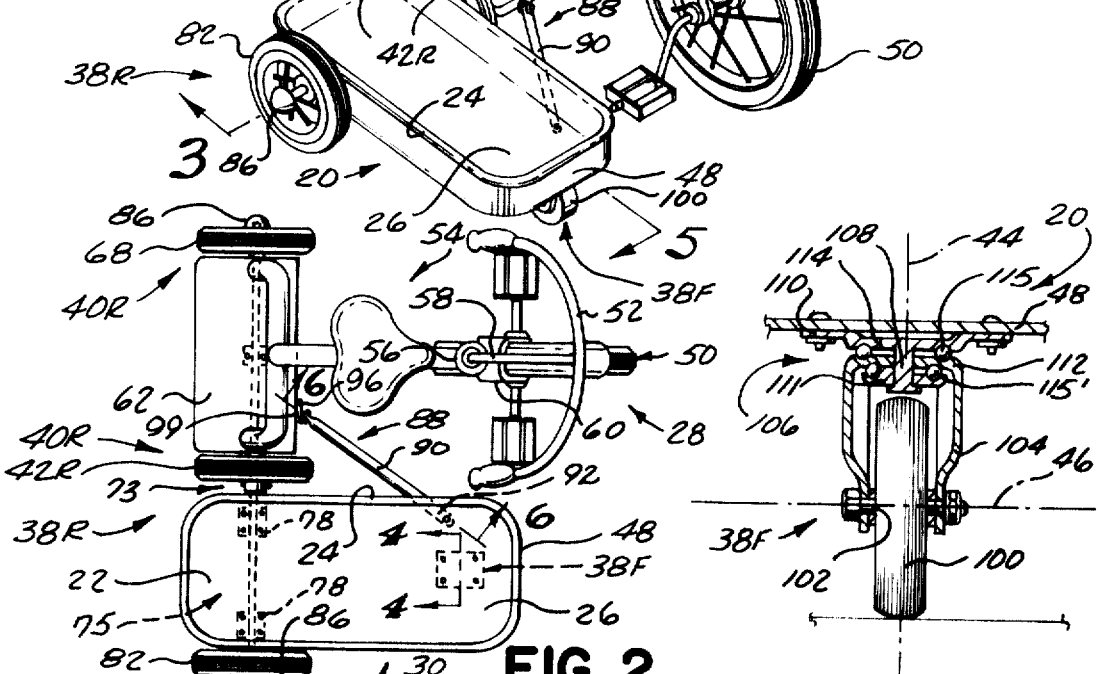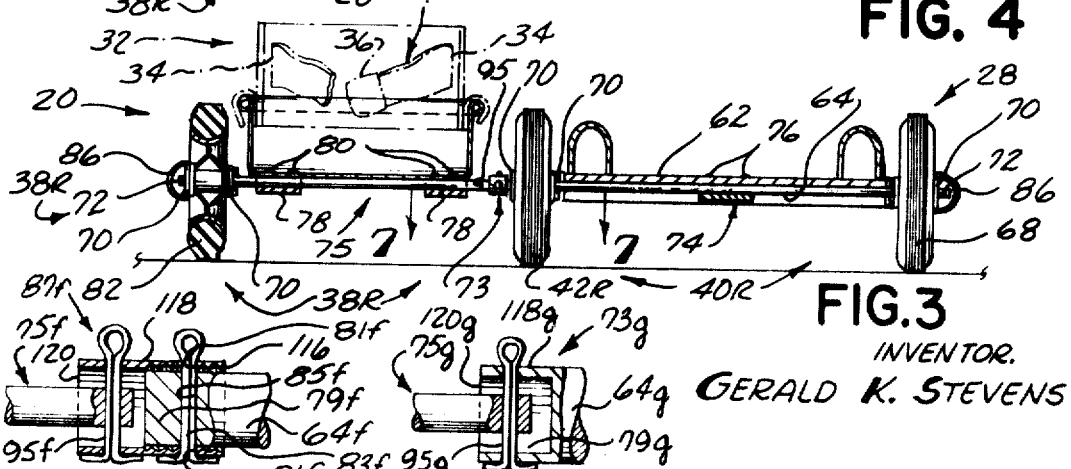
INVENTOR.
GERALD K. STEVENS

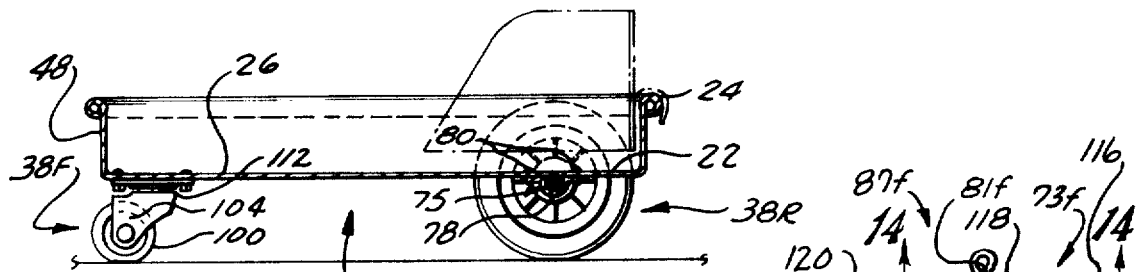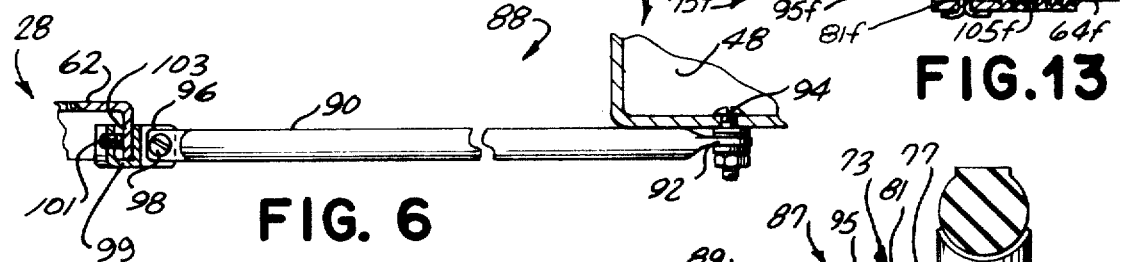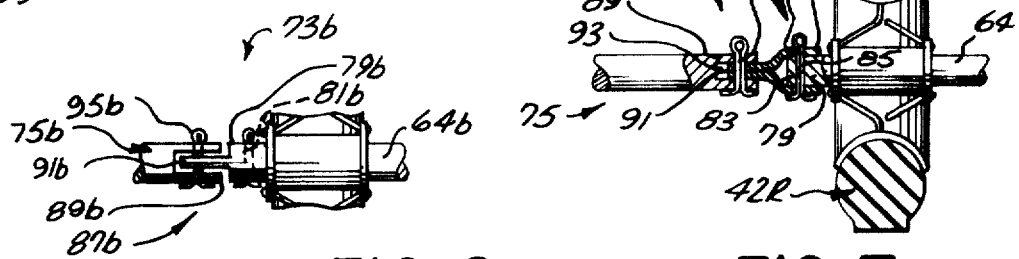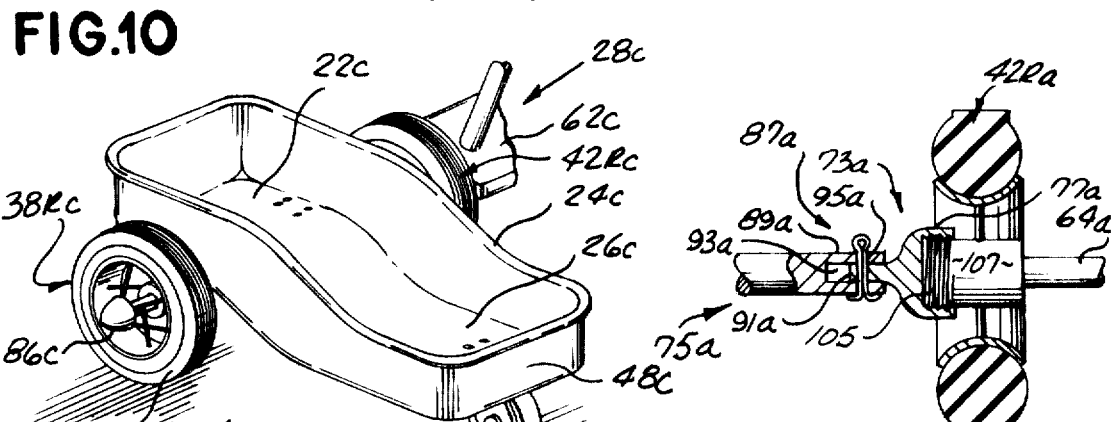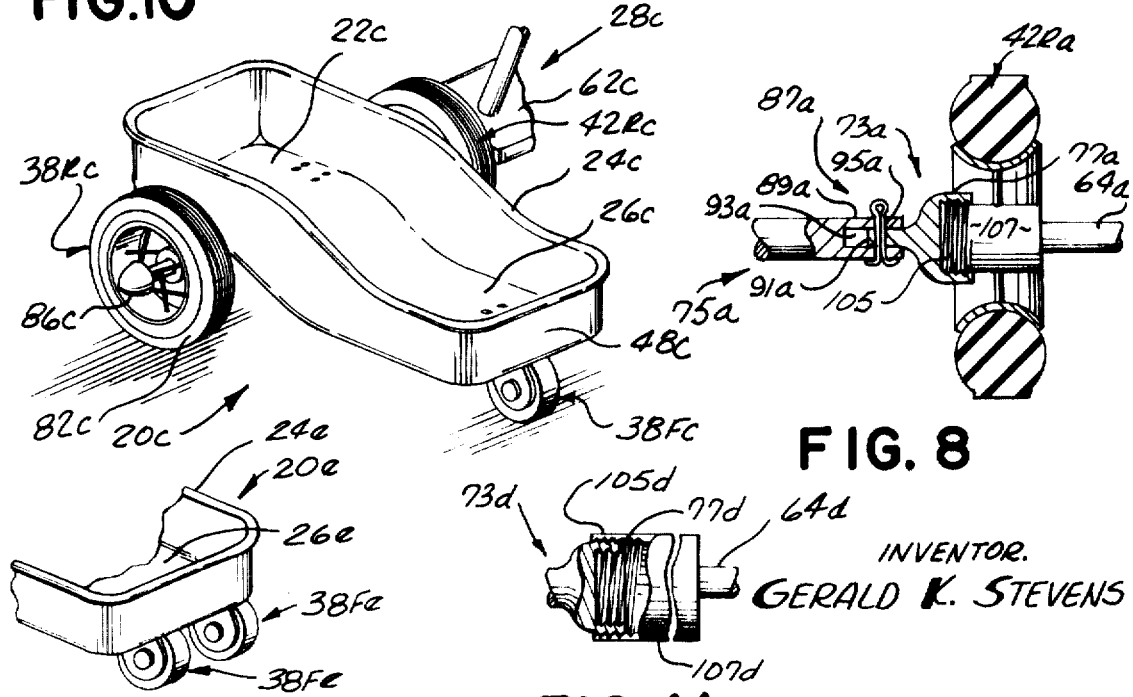

3,595,600

AXLE EXTENSION APPARATUS FOR WHEELED VEHICLE APPARATUS

This application is a continuation-in-part of copending application, Ser. No. 613,927, filed Feb. 3, 1967, now U.S. Pat. No. 3,415,539.

Generally speaking, the present invention, in its broadest possible sense, may be said to relate to the wheeled vehicle art and, more particularly, to an axle extension apparatus for wheeled vehicle apparatus which is primarily adapted to make it possible to laterally connect a main wheeled vehicle and an auxiliary wheeled vehicle so as to have the wheels thereof in lateral alignment mounted along a main vehicle axis and a coaxially arranged extension axle. The extension axle is connected to the main axle in a manner such as to provide substantial rigidity in a horizontal plane but vertical pivotal flexibility to at least a limited extent so as to allow relative vertical displacement of the main wheeled vehicle with respect to the auxiliary wheeled vehicle, or vice versa, to occur as they both move along an underlying surface which may vary in true elevation at various lateral locations thereof. In other words, if the main wheeled vehicle should move along an underlying surface portion which is substantially level while at the same time the laterally positioned auxiliary vehicle should move along a laterally displaced part of the underlying surface which is at a different elevation (that is, is either higher or lower) than the first-mentioned portion of said surface, it will be found that it is necessary for the auxiliary vehicle to be capable of moving either upwardly or downwardly relative to the main vehicle if full-rolling contact of all wheels with the underlying surface is to be maintained at all times. This would not be permitted by an effectively vertically rigid, extended axle incapable of any vertical movement with respect to the main axle. It is precisely this kind of limited vertical pivotal freedom of movement of the auxiliary extension axle relative to the main axle which is provided by the axle extension apparatus of the present invention.

Also, the axle extension apparatus of the present invention is arranged to be effectively attached with respect to a main vehicle so as to be substantially laterally coaxially aligned with respect to a main axle of the main vehicle in any of several different ways so as to be virtually universally adaptable for such mounting with respect to a main vehicle, either at the time of its original manufacture or subsequently. In one form of the invention, the attachment means is of a removable type adapted to be quickly attached to the end of such a main axle and to be just as easily and quickly disengaged therefrom when this is desired. In another type of arrangement, the attachment means for the auxiliary extension axle may comprise means adapted to be quickly and easily attached and detached relative to a main wheeled vehicle in substantially coaxial relationship with respect to a main axle thereof and, in certain embodiments of this form, this may take the form of a threaded member adapted to be threadedly engaged with respect to a corresponding mating threaded portion (such as a bearing housing or the like) of such a main vehicle, although a variety of other types of attachment means including the integral attachment of a portion of the auxiliary extension axle with respect to such a main axle are all intended to be included and comprehended within the board scope of the present invention.

In one preferred form, the main wheeled vehicle referred to above may comprise a tricycle and the auxiliary wheeled vehicle referred to above may take the form of a tricycle sidecar adapted to be carried by the main vehicle or tricycle rear axle and the auxiliary extension axle transversely coaxially aligned therewith and comprising a corresponding axle of the tricycle sidecar so that both the tricycle and the laterally adjacent tricycle sidecar will be adapted for simultaneous rolling movement along an underlying ground surface or the like. In this form of the invention, connection and coupling frame means may be provided and arranged to be connected between a body portion of the tricycle sidecar and a frame portion of the tricycle in a manner providing substantial horizontal rigidity but vertical pivotal flexibility of at least a limited extent so that the tricycle and the tricycle sidecar will be effectively rigidly interconnected in a horizontal direction but will be capable of limited vertical relative pivotal movement as the tricycle and the tricycle sidecar may pass over a relatively rough or uneven underlying supporting surface.

The above-mentioned horizontal rigidity but vertical pivotal flexibility of the auxiliary extension axle is provided by the inclusion of vertical pivot means carried by the extension axle adjacent to the attachment end thereof and between same and the transversely elongated remaining portion of said extension axle which mounts and carries the auxiliary wheeled vehicle or tricycle sidecar. The vertical pivot means is of a type which allows pivotal movement in a vertical plane but does not allow pivotal movement in a horizontal plane and, in the form of the invention referred to above wherein the main axle may be integrally provided with a portion of the extension axle, the vertical pivot means is normally initially separated, thus allowing the main axle to merely have an integral attachment means effectively causing the main axle to extend slightly beyond its normal terminus and to be provided at its end with one element of a two-element type of said vertical pivot means, with the other element of said vertical pivot means being carried by the separate, remaining, laterally extended portion of said extension axle and being capable of being easily attached to the first-mentioned element of said vertical pivot means whenever it is desired to effectively mount the extension axle in substantially coaxial, laterally extended relationship relative to the main axle for the auxiliary wheeled vehicle or tricycle sidecar mounting or attaching purposes relative to the main wheeled vehicle or tricycle mentioned above.

It should be noted that in the description which follows hereinafter the main wheeled vehicle is described in one exemplary form thereof wherein it comprises a tricycle and the auxiliary wheeled vehicle is described in one exemplary form thereof wherein it comprises a tricycle sidecar of a particular exemplary but nonspecifically limiting type. It should be understood that this is done for exemplary purposes only and that the invention is not specifically so limited to either such a particular type of auxiliary vehicle or such a particular type of main vehicle, and the description which follows hereinafter and the accompanying drawings should be broadly construed in the light of the foregoing statement.

A conventional tricycle usually has a frame, a controllably steerable front wheel which is mounted with respect to the frame for turning or steering movement toward the left and/or toward the right, around a substantially upwardly extending steering axis of rotation, with the frame being provided at or adjacent to the rear thereof with a pair of transversely spaced rear wheels. All three of the wheels are mounted for rotation around horizontal axes of rotation, one of which, in the case of the front wheel, is capable of directional displacement in a substantially horizontal plane (although this horizontal plane may in some cases be slightly inclined from a true horizontal) when the front wheel is turned for steering purposes. Said horizontal axis of rotation, in the case of each of the two rear wheels, normally takes the form of a common transversely directed horizontal axis of rotation since the two rear wheels are normally mounted in substantially parallel relationship with respect to each other in similar, parallel, fixed, forwardly directed, vertical planes relative to the tricycle frame.

Such a tricycle normally has a seat for a driver thereof carried by the frame at a convenient and usually substantially centered position with respect to the three wheels of the tricycle and usually is provided with a rear-stepped platform mounted between the two rear wheels, usually over a rear wheel axle on which the two rear wheels are mounted although not specifically so limited.

Such a conventional tricycle normally is provided with pedal means for foot operation in a manner such as to rotate at least one of the three wheels of the tricycle for propelling it along an underlying supporting surface. Usually there are two such pedal means, and they are connected in 180° opposition to each other with respect to a central hub portion of the turnable or steerable front wheel of the tricycle. However, certain prior art tricycles have been provided with means for coupling the foot-operated pedal means with respect to one or both of the rear wheels for propelling the tricycle.

The auxiliary wheeled vehicle described herein for exemplary purposes only may be said to comprise a tricycle sidecar and to include an auxiliary vehicle body means or compartment which may cooperate with either of the foregoing types of tricycles, and it should be noted that the present invention is directed to the axle extension apparatus for wheeled vehicle apparatus, per se, to the combination of such an axle extension apparatus with such an auxiliary wheeled vehicle for attachment to a main wheeled vehicle, or to the complete combination of such an auxiliary wheeled vehicle and a main wheeled vehicle and to the novel axle extension apparatus of the present invention, effectively attaching same together in a substantially horizontally rigid but vertically flexible manner.

The auxiliary wheeled vehicle of the present invention, in the preferred but nonspecifically limiting exemplary form thereof referred to herein, may be said to comprise a tricycle sidecar defining and taking the form of an upwardly open, hollow sidecar means having conveniently accessible seat means therein in which a driver of the tricycle may place any object which he wishes to take along with him as he rides the tricycle or which may be employed as an extra seat in which another child may sit while the first-mentioned child drives the tricycle.

The tricycle sidecar or sidecar means referred to above is provided with underlying ground-contactable, rollable wheel means and rotative mounting means rotatively attaching same in underlying and supporting relationship with respect to the sidecar means so that it can support a relatively heavy load without imposing any stress on the tricycle to which the auxiliary sidecar or sidecar means is effectively attached in laterally adjacent relationship.

Also, in one preferred form of the invention, said underlying wheel means carried by the tricycle sidecar or sidecar means includes rear wheel means coaxially mounted with respect to the rear wheel means of the tricycle and, in certain forms, having one centrally positioned rear wheel common to both the tricycle and the tricycle sidecar or sidecar means mounted on the effectively common, laterally directed axle comprising both the tricycle main rear wheel axle and the sidecar rear wheel axle comprising the previously mentioned extension axle. However, the apparatus of the present invention is not specifically limited to such an arrangement having a common, centrally positioned rear wheel, but may include an arrangement wherein the tricycle sidecar or sidecar means has a pair of rear wheel means separate and distinct from, and in addition to, the pair of rear wheel means of the tricycle, and in this latter case the two rear wheel means of the sidecar will normally be carried on the auxiliary extension axle while the two rear wheel means of the tricycle will normally be carried on the tricycle main rear wheel axle which are in coaxially aligned, laterally directed relationship.

In a preferred arrangement, the rear wheel means of both the tricycle and the sidecar or sidecar means are coaxially related and the sidecar or sidecar means, in one preferred form thereof, is provided with an additional forwardly positioned caster-type wheel (usually a single, centrally forwardly positioned wheel) mounted for swiveling rotation around a substantially vertical connection axis with respect to a forward central bottom portion of the sidecar in addition to being mounted for horizontal rotation during rolling movement thereof along an underlying ground surface or the like.

The above-described arrangement makes it possible for the forward end of the sidecar means to easily turn and follow any turning movement of the tricycle itself produced by manual steering of the tricycle by turning the front tricycle wheel in either direction.

The apparatus of the present invention also includes connection and coupling frame means for positively connecting the auxiliary sidecar and the underlying wheel means thereof in the desired laterally adjacent relationship with the rear wheel means of both the sidecar and the tricycle being in the coaxially related positions referred to hereinbefore and rigidly horizontally maintained in such positions while allowing a limited degree of vertical flexibility so as to allow the composite form of the invention to traverse relatively rough or uneven terrain.

In a preferred form of the invention the connection and coupling frame means may be of a type adapted to be horizontally rigidly but vertically pivotally connected to the rigid frame of an entirely conventional, preexisting tricycle after it has been manufactured so that the independently manufactured and separate sidecar and axle extension apparatus of the present invention can be connected and coupled in the relationship described hereinbefore with respect to such a preexisting tricycle when desired and, conversely, can be disconnected and decoupled therefrom when desired, thus making it possible to use such a conventional preexisting tricycle in an entirely conventional manner or to use it in combination with the novel sidecar apparatus and axle extension apparatus of the present invention according to the desires of the user.

In one version of the form of the invention mentioned above wherein the sidecar and the axle extension apparatus are adapted to be attached to a preexisting conventional tricycle after the manufacture thereof and in a controllably detachable manner so that it can be connected and disconnected as desired, this is normally accomplished by the provision of effective attachment means at one end of an auxiliary extension axle of the present invention which can be quickly attached in coaxial relationship with respect to the end of a main rear wheel axle of the tricycle, thus placing all of the rear wheels of the tricycle and the tricycle sidecar in laterally spaced, parallel relationship for rotation about an effectively extended common rear wheel axle. In this form of the invention, the above-mentioned connection and coupling frame means may effectively comprise a truss-type structure adapted to be quickly and easily manually removably angularly connected between a forward portion of the auxiliary tricycle sidecar and a rigid frame portion (such as the rear-stepped platform portion) of the tricycle in a manner providing horizontal rigidity to the complete assembled structures but also providing a limited extent of vertical pivotal flexibility so that the tricycle sidecar can pivot with respect to the tricycle in a vertical plane to allow the tricycle and the sidecar to traverse uneven underlying terrain having different elevations.

There are a few types of prior art tricycles which do not have extended rear axle ends and which may not be capable of direct engagement by the attachment means referred to above, and when this situation prevails, the attachment means may be modified to be removably attachable with respect to any portion of the tricycle in a substantially coaxial manner with respect to the rear axle thereof. This may, in certain forms, be provided by having said attachment means threadedly or otherwise attachable to an outside portion of a tricycle rear wheel bearing or bearing housing or any other substantially functionally equivalent structure.

It should also be noted that, in certain forms of the invention, the manufacturer may initially manufacture the tricycle rear wheel axle in a manner such as to be directly capable of mounting and dismounting the main portion of the extension axle of the present invention and may do so by having a short portion of the extension axle adjacent to the so-called attachment means thereof integrally attached to and effectively comprising a short extension of such a main rear wheel axle for a tricycle and may have said short extension portion provided with one element of a vertical pivot means of the novel extension axle of the present invention with the other element of said vertical pivot means being carried by the remainder thereof, and adapted to be easily engaged and disengaged with respect to said first-mentioned element of said vertical pivot means. This, of course, effectively makes it possible to use the tricycle without the major portion of the extension axle being attached thereto and without the tricycle sidecar being attached thereto. Under such circumstances the tricycle will be used in an entirely conventional manner. However, when it is desired to attach the tricycle sidecar, it is only necessary to pivotally engage the first and second portions of the vertical pivot means, and the extension axle will be automatically connected in substantially laterally coaxial relationship with respect to the main rear wheel tricycle axle and, of course, the tricycle sidecar carried by the main portion of the extension axle will be laterally mounted adjacent to the tricycle and the composite apparatus will be adapted to operate in substantially the manner described in detail hereinbefore.

With the above points in mind, it is an object of the present invention to provide a novel axle extension apparatus for wheeled vehicle apparatus capable of effectively extending an axle in a manner providing substantial rigidity in a horizontal plane but vertical flexibility to at least a limited extent between adjacent portions of such an effectively extended axle.

It is a further object of the present invention to provide axle extension apparatus of the character referred to in the preceding object wherein a portion of the extension axle carries an auxiliary wheeled vehicle adapted for attachment with respect to a main wheeled vehicle when the axle extension apparatus is effectively connected with respect to an axle of such a main wheeled vehicle.

It is a further object of the present invention to provide apparatus of the character set forth in the preceding object wherein the auxiliary wheeled vehicle takes the form of a tricycle sidecar adapted for such attachment to such a main wheeled vehicle taking the form of a tricycle.

It is a further object of the present invention to provide apparatus of the character set forth in the first hereinabove-detailed object including, in combination therewith, both an auxiliary wheeled vehicle carried by an extension axle portion of said apparatus and a main wheeled vehicle carried by a main axle thereof, with said axle extension portion of said auxiliary wheeled vehicle and said main axle of said main wheeled vehicle being effectively connectable in substantially laterally extended coaxial relationship.

It is a further object of the present invention to provide apparatus of the character set forth in the preceding object wherein the auxiliary wheeled vehicle takes the form of a tricycle sidecar, and the main wheeled vehicle takes the form of a tricycle and wherein the invention comprises the complete combination thereof together with the axle extension apparatus effectively connecting same.

It is a further object of the present invention to provide apparatus of the character referred to herein having any or all of the advantages referred to herein generically and/or specifically and individually or in combination, and which is of extremely inexpensive, foolproof, easy to mount and dismount construction adapted for ready mass manufacture and suitable for cooperation with virtually all known types of tricycles whereby to be conducive to widespread use of the present invention, either as original equipment provided with the tricycle at the time of manufacture or as an individual kit or item sold separately from a conventional preexisting tricycle and adapted for attachment thereto subsequent to the manufacture of the conventional preexisting tricycle and which allows the tricycle to be used individually or in association with the tricycle sidecar to comprise a combination of the composite vehicle.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if detailed with great particularity herein.

For the purpose of clarifying the nature of the present invention, several exemplary embodiments of the invention are illustrated in the hereinbelow-described figures of the accompanying two sheets of drawings and are described in detail hereinafter.

FIG. 1 is a reduced size, three-dimensional, pictorial view illustrating one exemplary embodiment of the present invention wherein one exemplary and nonspecifically limiting type of auxiliary wheeled vehicle taking the form of a tricycle sidecar is shown mounted by one exemplary form of the novel axle extension apparatus of the present invention in cooperative, laterally adjacent relationship with respect to one exemplary type of main vehicle taking the form of a tricycle so as to effectively comprise a combination or composite vehicle which is capable of being driven about as a unit.

FIG. 2 is a top plan view of the apparatus shown in FIG. 1.

FIG. 3 is a fragmentary, sectional view, taken substantially along the plane and in the direction indicated by the arrows 3-3 of FIG. 1 and illustrates in phantom lines an optional alternate, auxiliary, rear, upstanding back portion for the tricycle sidecar.

FIG. 4 is a fragmentary, enlarged, detailed, cross-sectional view illustrating the structure of the front wheel swivel-mounting means taken substantially along the plane and in the direction indicated by the arrows 4-4 of FIG. 2.

FIG. 5 is a fragmentary, partly sectional view, taken substantially along the plane and in the direction indicated by the arrows 5-5 of FIG. 1.

FIG. 6 is a fragmentary, partially broken away, enlarged, sectional view taken substantially along the plane and in the direction indicated by the arrows 6-6 of FIG. 2 and with portions of the apparatus substantially behind the plane of the section being eliminated from and not shown in this view for reasons of drawing simplification and clarity.

FIG. 7 is an enlarged, fragmentary, sectional view taken substantially along the plane and in the direction indicated by the arrows 7-7 of FIG. 3.

FIG. 8 is a fragmentary, broken away view, partly in section and partly in elevation, generally similar to FIG. 7, but illustrating a slight modification of the attachment means of the novel extension axle of the present invention.

FIG. 9 is a further fragmentary, partly broken away and partly elevational and sectional view of the same general type as shown in FIGS. 7 and 8, but illustrates a further modification of the attachment means wherein it comprises an integral extension of the main tricycle rear wheel axle.

FIG. 10 is a view generally similar to the auxiliary vehicle portion of FIG. 1, but is drawn to a somewhat larger scale than FIG. 1 and has the major portion of the tricycle broken away. Also, in this view, the auxiliary wheeled vehicle or tricycle sidecar is of a modified form.

FIG. 11 is a fragmentary view similar to a portion of FIG. 8 but shows a further very slight modification of the attachment means thereof.

FIG. 12 is a fragmentary, perspective view similar to a portion of FIG. 1, but illustrates a slight modification of the front-wheel means supporting the front of the sidecar.

FIG. 13 is a fragmentary view similar to a portion of FIG. 7 but shows a further very slight modification of the attachment means thereof.

FIG. 14 is a fragmentary, partly sectional view of the modified attachment means of FIG. 13, taken at right angles thereto in the direction of the arrows 14-14 of FIG. 13.

FIG. 15 is a fragmentary view similar to a small portion at the right end of the attachment means shown in FIG. 13 and merely illustrates its slightly different attachment with respect to a slightly smaller diameter and unthreaded tricycle axle end of the same type as shown in FIG. 7.

FIG. 16 is a fragmentary view generally similar to FIG. 14 but is of a modified form of the invention of the same general type as illustrated in FIG. 9 wherein the attachment means comprises an integral connection of the right end of the tube of FIGS. 13 and 14 to the left end of the tricycle axle and wherein the pivot pin takes over the double function of acting as a pivot means and a means for connecting and disconnecting the extension axle.

FIGS. 1—7 illustrate one exemplary first form of the invention and, in certain of said figures, an auxiliary wheeled vehicle is generally designated by the reference numeral 20 and is shown as comprising a tricycle sidecar or sidecar means which takes the form of and effectively defines an upwardly open, hollow body means or compartment,, also generally designated by the reference numeral 20, having a rear bottom portion which may be said to effectively comprise a conveniently accessible seat means at the location indicated at 22 positioned within the encircling sidewall means 24, with said hollow sidecar 20 also having a forward bottom wall portion which may be said to effectively comprise a foot-receiving portion or platform at the location indicated at 26 positioned in front of the seat portion 22 so that the entire sidecar 20 is well adapted to receive a seated child therein, a toy, a doll, a pet, or any other object which a child may wish to place in the sidecar 20 so that it will accompany him as he drives about on the tricycle, which is generally designated by the reference numeral 28.

The hollow sidecar means may be provided with an auxiliary upstanding back portion, such as is indicated generally in phantom at 32 in FIG. 3, which may carry in slots 34 thereof, or which may otherwise carry, a seatbelt such as is indicated generally in phantom at 30 in FIG. 3, which may have fastening buckle means or the like at the inner ends thereof such as indicated in phantom at 36 in FIG. 3. This provides a convenient means for fastening a child in seated position within the sidecar 20. However, it should be clearly understood that the invention is not limited to the use of such an auxiliary back 32, seatbelt means 30, or, indeed, to the use of any specific type of auxiliary back or seatbelt means at all.

It should be noted that, in the exemplary first form of the invention illustrated in FIGS. 1—7, the sidecar 20 comprises a conventional type of metal wagon with the front-steering mechanism and wheels removed, thus making it possible to minimize tooling and capital investment costs since such a conventional preexisting wagon can be appropriately modified and used for the auxiliary vehicle or sidecar 20.

The sidecar 20 is provided with underlying ground-contactable, rollable wheel means and rotative mounting means for rotatively attaching same in underlying relationship with respect to the sidecar 20. In the first exemplary form of the invention illustrated, said sidecar wheel means comprise rear wheel means 38R and front-wheel means 38F.

In the exemplary first form of the invention, the rear sidecar wheel means 38R may be said to effectively comprise a pair of wheels transversely horizontally spaced apart and mounted in transversely related, coaxial relationship with respect to the rear wheel means, generally designated at 40R of the tricycle 28.

However, it should be noted that the rear wheel means 38R of the sidecar 20 and the rear wheel means 40R of the tricycle 28 actually have a common central rear wheel 42R which may be said to effectively comprise part of a rear pair of wheels 38R of the sidecar means 20 and a rear pair of wheels 40R of the tricycle 28. Thus, it should be clearly understood that reference herein to said two pairs of rear wheel means, which seems to imply four wheels, is not limited to a four-wheel arrangement, although such is intended to be included and comprehended within the broad scope of the present invention, but actually such two effective rear pairs of wheels are to be understood, when referred to herein, as comprising either a three-wheel arrangement of the type illustrated in the first form of the invention shown in FIGS. 1—7 wherein the center rear wheel 42R is a common wheel and effectively comprises a part of each of said rear pairs of wheels 38R and 40R, or an arrangement wherein four rear wheels actually are used in a substantially identical manner with two of the wheels being centrally positioned and being functionally equivalent to the single common central rear wheel 42R best shown in FIG. 3.

The front sidecar wheel means 38F referred to above effectively comprises a forwardly positioned, caster-type wheel means mounted for swiveling rotation around a substantially vertical connection axis, such as is designated in broken lines at 44 in FIG. 4, in addition to being rotatably mounted for rotation around a horizontal axis such as is indicated in broken lines at 46 in FIG. 4, thus providing for convenient simultaneous turning movement of the forward or front end 48 of the sidecar 20 when the steerable front wheel 50 of the tricycle 28 is correspondingly turned by twisting the handlebar means 52 of the tricycle 28.

In the exemplary first form of the invention illustrated, the tricycle 28, which may be of any substantially conventional type, has a main structural frame such as is indicated generally at 54, which has a rotative mounting sleeve 56 which rotatively mounts the descending connecting rod 58 connected between the steering handlebar means 52 and the bifurcated yoke 60 which rotatably mounts the steerable front-wheel means 50 for rotation around a horizontal axis of rotation which is laterally pivotally displaceable around the axis of sleeve 56 depending upon the position of the handlebar means 52 as determined by a driver of the tricycle 28.

The tricycle frame 54 also includes a rear step or platform portion 62 which is normally provided with a rear axle member 64 as is best shown in FIG. 3, which is of a length just adequate to extend beyond each end of the step or platform member 62 to an extent such as to rotatively mount the conventional two rear wheels 68 and 42R at opposite ends of said main rear wheel axle 64, with appropriate washers 70 and retaining cotter pins such as the exemplary one shown at 72 providing the proper mounting and retention of the wheels 68 and 42R thereon.

In one prior art type of tricycle as illustrated in FIGS. 1—7 showing the first form of the invention, the rear wheel axle 64 is fastened underneath the step or platform portion 62 of the tricycle frame 54 by an appropriate fastening bracket or clamp such as is generally designated at 74, which is bolted to the bottom of the step or platform member 62 by threaded fastener means 76. This acts to rotatively immobilize the axle 64 and to lock it in the proper position. However, it should be clearly understood that various types of tricycle construction having various different ways of mounting the rear axle may be employed with the novel axle extension apparatus of the present invention and an auxiliary wheeled vehicle such as exemplified by the sidecar 20 in one form, and all such arrangements are intended to be included and comprehended within the broad scope thereof.

When the sidecar 20 and associated apparatus of the present invention is to be connected and coupled with respect to a conventional tricycle, such as that shown at 28, so as to assume the effectively unitary relationship illustrated in the first form of the invention shown in FIGS. 1—7 inclusive, all that is necessary to do is to remove the cotter pin 72 from the left end, as viewed in FIG. 3, of the conventional tricycle main rear axle 64 (of course, after initially removing the left-covering hubcap, such as the exemplary one shown at 86, carried by the opposite or right end of the axle 64) and to then attach thereto the attachment means, indicated generally at 73, of the extension axle, indicated generally at 75, to the left end of the main tricycle rear wheel axle 64, as is clearly shown in FIGS. 3 and 7. This will, of course, effectively extend or lengthen the main rear wheel tricycle axle 64 by the addition of the extension axle 75 thereto in laterally extending, coaxial, aligned relationship so as to, in effect, provide an extended or lengthened common axle comprising both of the axles 64 and 75 with the first or main tricycle rear wheel axle 64 passing through the two tricycle wheels 68 and 42R and with the auxiliary or extension axle 75 extending leftwardly from the attachment means 73 underneath the rear end of the sidecar 20 and through two fastening clamps 78 adapted to be fastened by threaded fastener means 80 and outwardly to a position just beyond the outer or left side of the sidecar 20 as viewed in FIG. 3, where an extra or outer wheel 82 is positioned on the outer or left end of the extension axle 75. Appropriate washer means 70 may be mounted on both the extension axle 75 and the main axle 64, and appropriate retaining cotter pin means 72 similar to the right-end positioned one shown at 72 in FIG. 3 may be positioned extending through corresponding, transverse axle apertures whereby to appropriately fasten the assembled structure together.

Opposite ends of the effective common axle comprising the main tricycle rear wheel axle 64 and the auxiliary extension axle 75 may be covered by the previously mentioned end cap means 86, the left one of which as shown in FIG. 3 may actually comprise the left end cap means which originally covered the left end of the tricycle main rear wheel axle 64 prior to its removal to allow the attachment of the extension axle 75 to the left end of the main tricycle rear wheel axle 64 by the attachment means 73.

The above-mentioned attachment means, generally designated by the reference numeral 73 in the exemplary first form of the invention, comprises a hollow sleeve 77 adapted to receive therein a left end 79 of the main tricycle rear wheel axle 64, with said hollow sleeve 77 being transversely provided with locking aperture means 81 and locking pin means such as the cotter pin means 83 (best shown in FIG. 7) adapted to be inserted through the locking aperture means 81 and the corresponding conventional cotter pin aperture 85 carried by the conventional left end 79 of the conventional main tricycle rear wheel axle 64. The arrangement positively locks the extension axle 75 to the left end 79 of the main tricycle rear wheel axle 64 in a manner which allows quick engagement and disengagement thereof. However, it should be clearly noted that various other types of attachment means substantially functionally equivalent to the exemplary first form thereof, best illustrated in FIG. 7, are intended to be included and comprehended within the broad scope of the present invention.

The extension axle 75 and the attachment means 73 are effectively provided therebetween with vertical pivot means, such as is indicated generally by the reference numeral 87, which is effectively rigid in a horizontal plane but effectively vertically pivotally flexible within predetermined vertical pivotal movement limits whereby to permit the entire extension axle 75 to pivot vertically with respect to the main tricycle rear wheel axle 64 so as to allow the composite vehicle best shown in FIG. 1 to traverse somewhat uneven or irregular terrain which would otherwise not be possible without damaging the composite vehicle.

In the exemplary first form of the invention illustrated, the vertical pivot means 87 is of a two-element type wherein one of said elements is connected to the extension axle 75 adjacent to one end thereof (in the exemplary arrangement best shown in FIGS. 3 and 7, at the right end thereof), and the other of said two elements of said vertical pivot means 87 is connected to the attachment means 73 (in the example best shown in FIGS. 3 and 7, connected to the left end of the attachment means 73). The first-mentioned one of said elements of the pivot means 87 shown in FIG. 7 comprises a bifurcated yoke means 89 and the other of said elements comprises a tongue means 91 adapted to be placed within the vertical slot 93 defined by the bifurcated yoke means 89, with both of said elements being provided with aligned transversely directed apertures and pivot pin means 95 extending horizontally thereacross and effectively pivotally interconnecting said first and second elements of said pivotal hinge means 87 in a manner which positively prevents horizontal relative movement thereof but which allows relative vertical pivotal movement thereof within said previously mentioned predetermined vertical pivotal movement limits. The limiting of said vertical pivotal movement may be provided in any of a variety of different manners in different forms of the invention, and in the exemplary first form of the invention may be provided by the limited movement of the vertically narrow tongue means 91 within the somewhat greater vertical clearance provided by the vertical slot 93, which is exteriorly closed at the top and bottom of the bifurcated yoke means 89. Also, if desired, the limiting of vertical pivotal movement referred to above may be provided by the relatively close juxtaposition of the extreme right end of the bifurcated yoke means 89 and the adjacent enlarged portion of the left end of the hollow sleeve 77, being so arranged as to abut each other after such limited vertical pivotal movement. Both arrangements, either of which may be employed for this vertical pivotal movement-limiting action, are clearly illustrated in FIG. 7.

The assembled or combination form of the invention may be provided with connection and coupling frame means for controllably attachable and detachable connection between the sidecar 20 and the tricycle 28 in a manner such as to produce a horizontally rigid interconnection therebetween so that the sidecar means 20 will at all times remain in a horizontal sense in substantially true parallel, laterally positioned relationship with respect to the tricycle 28 irrespective of what type of movement the tricycle 28 is going through.

However, the connection and coupling frame means is adapted to permit relative vertical pivotal movement of said sidecar 20 with respect to the tricycle 28 to allow the composite vehicle to traverse relatively uneven terrain. This vertical pivotal feature of the connection and coupling frame means cooperates with the previously mentioned vertical pivotal movement feature of the extension axle 75 provided by the vertical pivot means 87 and is provided for the same purpose.

In the exemplary first form of the invention illustrated in FIGS. 1—7, said connection and coupling frame means is generally designated by the reference numeral 88 and may be said to comprise a rigid guide bar or tube 90 connected in a manner such as to define what might be termed a truss-type connection and coupling frame means in a horizontal planar sense, acting to provide a horizontally rigid connection between a forward portion 48 of the sidecar 20 and the previously mentioned step or platform portion 62 of the frame 54 of the tricycle 28. In the example illustrated, this is provided by having a forward end 92 of said guide bar or rod 90 connected by a threaded fastener means 94 to a bottom portion of the forward part 48 of the sidecar 20 and by having a 90° rotatively displaced rear end 96 of said guide rod member 90 pivotally connected by a horizontally directed fastener means 98 to a bracket portion 99 which is fastened by another threaded fastener 101 to an edge part 103 of the step or platform portion 62 of the tricycle 28 at a front edge location thereof substantially laterally and rearwardly offset from the other end 92, thus providing a horizontal planar-type truss connection and coupling interconnection arrangement capable of vertical pivotal movement as previously mentioned, which is most clearly shown in FIGS. 2 and 6.

The previously mentioned front sidecar wheel means 38F comprises a wheel 100 pivotally mounted by a horizontal axle or stud member 102 between opposite sides of the yoke member 104 which extends upwardly to a position above the wheel 100 and there is provided with swivel-mounting means, such as is generally designated at 106, and which may be of any conventional type, although in the example illustrated it comprises a central stud portion 108 fastened by an upper fastening bracket portion 110 to the undersurface of the front end 48 of the sidecar 20, and which has rotatively mounted immediately above a lower retention disc 111 carried at the bottom of said stud member 108, a lower ball bearing, race-defining member 112 connected to the upper end of the yoke member 104 and positioned in opposition to an upper ball bearing race-defining portion 114 formed in the center part of said fastening bracket 110, with ball bearings 115 positioned in the circular raceway defined therebetween, and with additional ball bearings 115' being positioned below the lower ball bearing race-defining member 112 in a lower pair of opposed ball bearing race-defining members or portions defined by the members 112 and 111, whereby to effectively rotatively mount the race-defining member 112 both above and below by the upper ball bearings 115 and the lower ball bearings 115', respectively, thus providing a very efficient type of swivel mounting means 106 but, as pointed out hereinabove, not specifically limiting the invention to the particular swivel-mounting means 106 illustrated and just described.

Of course, it should be understood that the tricycle 28 can be converted from its normal individual tricycle form into a combination or composite vehicle such as is shown in FIGS. 1—7, inclusive, in the manner described hereinbefore and that, conversely, it can be again converted back into a separate, individually usable tricycle at any time that this is desired by merely reversing the assembly procedure described hereinbefore—that is, by disengaging the attachment means 73 from the left end 79 of the main tricycle rear wheel axle 64 and removing the complete extension axle 75 and sidecar 20, after which the cotter pin 72 should be replaced in the transverse axle aperture 85, and the left hubcap 86 shown in FIG. 3 should be placed over the cotter pin 72 and the left end 79 of the main tricycle rear wheel axle 64. The connection and coupling frame means 88 is, of course, also detached.

The tricycle 28 is then completely detached from the sidecar 20 and is entirely conventional.

FIG. 8 illustrates a slight modification of the attachment means 73 of the first form of the invention, and because it is a modification parts structurally or functionally similar to or analogous to those of the first form of the invention are designated by the same reference numerals, followed by the letter "a," however. In this modification, the attachment means 73a takes the form of a transversely extending, hollow, interiorly threaded sleeve member 77a adapted to be threadedly engaged with respect to a corresponding exteriorly threaded portion of the tricycle in a manner substantially coaxial with respect to the main tricycle rear wheel axle 64a. In the exemplary form illustrated in FIG. 8, this is accomplished by threading the sleeve 77a onto an exteriorly threaded portion 105 of a bearing assembly, indicated generally at 107, rotatably mounting the wheel 42Ra on the main tricycle rear wheel axle 64a. This comprises one type of modified attachment means, indicated generally by the reference numeral 73a, but it should be understood that it is merely representative of a number of other attachment means modifications, all of which are intended to be included and comprehended within the broad scope of the present invention.

FIG. 9 is a view similar in many respects to FIG. 8, but illustrates a further slight modification of the attachment means 73 of the first form of the invention and of the modified form thereof indicated at 73a in the FIG. 8 modification of the invention. Because this is a modification, parts which are structurally or functionally similar to or analogous to the previously described forms of the invention are designated by similar reference numerals, followed by the letter "b," however. In this modification, it will be noted that the so-called attachment means, indicated generally by the reference numeral 73b, effectively comprises the integral connection of the tongue 91b to the left end 79b of the main tricycle rear wheel axle 64b. The pivot means 87b comprising the tongue 91b and the bifurcated yoke 89b still functions in the same manner as the corresponding elements of the pivot means 87 of the first form of the invention previously described in detail and best shown in FIG. 7 although as illustrated in FIG. 9, the primary reliance for the previously mentioned vertical pivotal movement-limiting action is placed upon the closely adjacent positioning of the extreme right end portions of the yoke 89b to the adjacent enlarged left end portion 79b and upon the vertical pivotal movement limitation resulting therefrom. However, in the FIG. 9 modification of the invention, said pivot means 87 also functions as an engagement and disengagement means since all that is necessary to do is to remove the retaining pin 95b whenever the extension axle 75b is to be completely detached from coaxial aligned relationship with respect to the main tricycle rear wheel axle 64b. Conversely, whenever the extension axle 75b is to be coaxially attached to the main tricycle rear wheel axle 64b, it is only necessary to engage the tongue and bifurcated yoke portion 91b and 89b and to insert the retaining cotter pin 95b and the extension axle and main axle will be effectively attached and will also be horizontally rigid but vertically pivotally flexible. The connection and coupling means in this modification can be substantially the same as that shown at 88 in the first form of the invention and, therefore, need not again be described.

It will, of course, be understood that, in the FIG. 9 modification, the original tricycle manufacturer produces the tricycle main rear wheel axle 64b with the integrally attached tongue extension 91b which does not interfere with the normal operation of the tricycle in an entirely conventional manner and, indeed, said extending tongue portion 91b can be normally completely covered by a hubcap similar to that shown at 86 in the first form of the invention, although appropriately shaped to fully enclose and encompass the tongue extension 91b.

FIG. 10 illustrates a further slight modification, and parts which are similar structurally or functionally are designated by similar reference numerals, followed by the letter "c," however. This modification pertains primarily to a modified type of tricycle sidecar, generally designated by the reference numeral 20c, wherein it will be noted that the rear-positioned seat portion 22c is located somewhat higher than the front-positioned footrest portion 26c, and this is made possible by a special shape provided in the manufacturing of the tricycle sidecar 20c. If desired, the rear wall of the modified tricycle sidecar 20c may have a further upward backrest extension similar to that generally designated in phantom at 32 in FIG. 3 (although it may be integral if desired in the FIG. 10 modification) which may be similarly provided with a seatbelt, such as is indicated in phantom at 30 in FIG. 3, or any other substantial functional equivalents thereof may be provided in lieu thereof if desired.

It should be noted that the attachment means, indicated generally at 73, of the first form of the invention, as best shown in FIG. 7, is not limited to an arrangement wherein the locking aperture means 81, the corresponding conventional cotter pin aperture 85 carried by the conventional left end 79 of the conventional main tricycle rear wheel axle 64, and the cotter pin 83, are arranged in a horizontal plane. Actually, they may all be arranged in a vertical plane in lieu of the horizontal planar arrangement shown in FIG. 7 or may be positioned in any other planar relationship between horizontal and vertical and, in certain forms of the invention, the sleeve 77 may be initially provided with several such sets of locking apertures 81 lying in different planes so as to be capable of easy attachment with respect to various different types of main tricycle axle ends such as the exemplary one shown at 79 in FIG. 7.

FIG. 11 illustrates a very slight modification of the attachment means, indicated generally at 73a, of the FIG. 8 modification thereof, and because it is a modification, parts which are structurally or functionally similar to or analogous to those of the FIG. 8 form of the invention or other previously described forms of the invention are designated by the same reference numerals, followed by the letter "d," however. In this modification, the attachment means 73d takes the form of a transversely extending hollow sleeve member 77d which is shown as being both interiorly threaded in the manner of the FIG. 8 modification of said attachment means and also as being exteriorly threaded for threaded engagement within a corresponding interiorly threaded portion of a tricycle in a manner substantially coaxial with respect to the main tricycle rear wheel axle 64d. In the exemplary form illustrated in FIG. 11, this is accomplished by threading the sleeve 77d into an interiorly threaded portion 105d of a bearing assembly or the like, such as is indicated generally by the reference numeral 107d, which rotatably mounts a wheel in a manner similar to that shown in FIG. 8 so as to be coaxial with the main tricycle rear wheel axle 64d. It should be clearly noted that the FIG. 11 arrangement makes it possible to thread the sleeve 77d into a relatively large, interiorly threaded tricycle portion 105d in the manner shown in FIG. 11 or to thread it onto the exterior of a somewhat smaller tricycle portion such as that shown at 105 in FIG. 8. Thus, FIG. 11 shows an adaptable arrangement capable of being attached to two different sizes of tricycle portion 105, which may comprise the end portion of a conventional tricycle bearing assembly or the like, and in certain forms of the invention it is possible to thus be adaptable for attachment to virtually all sizes and types of tricycles having such bearing assemblies since the two sizes of connecting tricycle portion 105 and 105d illustrated in FIG. 8 and in FIG. 11, respectively, cover virtually all tricycles presently being manufactured.

It should also be noted that, in lieu of the threaded interior connection shown in FIG. 8 and the threaded exterior connection shown in FIG. 11, the sleeve 77a of FIG. 8 and 77d of FIG. 11 may be attached by through-passing fasteners such as the locking pin means 83, best shown in FIG. 7, and corresponding locking apertures, such as shown at 81 and 85 in FIG. 7, which may be arranged in one or more relative positions around the axis of the axle 64a in the case of FIG. 8 and 64d in the case of FIG. 11. In other words, the attachment sleeve 77a or 77d may make a mating engagement of either of the two types illustrated in said figures which may be attached by threaded means or various other types of fastening means substantially functionally equivalent thereto and, in certain forms of the invention, an end-to-end type of butt fastening may be provided through the use of an auxiliary coupling element or means. The important point to note is that the invention is not specifically limited in this regard to the specific attachment sleeve structures illustrated in the various exemplary forms of the invention shown in the different figures of the drawings, which are merely representative of a number of different forms which such attachment means may take.

FIG. 12 fragmentarily illustrates a slight modification of the front-wheel means 38F of the first form of the invention, and because it is a modification, parts which are structurally or functionally substantially equivalent or similar to those of the first form of the invention are designated by similar reference numerals, followed by the letter "e," however. In this modification, it will be noted that the front end of the sidecar 20e is provided with and supported by two front-wheel means 38Fe, each of which is generally similar to the single-castered front-wheel means 38F of the first form of the invention, but in this case being laterally spaced apart so as to support the front end of the sidecar 20e in a nontipping manner despite the traversal of uneven terrain, turning movements, and the like.

The slight modification of the invention shown fragmentarily in fIGS. 13 and 14 is functionally similar to the various forms of attachment means and vertical pivot means shown at 73 and 87, respectively, in the first form of the invention (as best shown in FIG. 7), shown at 73a and 87a, respectively, in the FIG. 8 modification of the invention, shown at 73b and 87b, respectively, in the FIG. 9 modification of the invention, and shown at 73d in the case of the attachment means, in the FIG. 11 modification of the invention. In the modified form thereof shown in FIGS. 13 and 14, the attachment means, which is designated generally by the reference numeral 73f, comprises an interiorly threaded end 116 of a short length of tubing 118 which may be approximately 1 inch in length, although not specifically so limited, while the modified form of vertical pivot means, which is generally designated by the reference numeral 87f, comprises the laterally apertured opposite end 120 of the tubing 118 having the pivot pin means 95f positioned in aligned apertures carried by the corresponding end of the extension axle 75f and the left end 120 of the tubing 118. It will be noted that since the inside diameter of the left end 120 of the tube 118 is substantially greater than the exterior diameter of the right end of the extension axle 75f, as is best shown in FIG. 14, there is room for the limited vertical pivotal flexible movement previously referred to as an important feature of the complete invention. For example, if the right end of the extension axle 75f is 1/4-inch in diameter, while the inside diameter of the left end 120 of the tube 118 is 3/8-inch in diameter, I have found that this provides sufficient freedom for limited extent vertical pivotal movement of the vertical pivot means 87f, although the invention is not specifically limited to such dimensions, which are merely illustrative.

It should also be noted that the modified attachment means 73f at the right end 116 of the short tube 118 is interiorly threaded so as to be capable of being threaded onto a threaded end of a tricycle axle or bearing structure, or other corresponding end portion carried thereby, which is designated by the reference numeral 105f, while the remainder of the tricycle axle is designated by the reference numeral 64f. This makes it possible to thread the tube 118 onto the tricycle axle end portion 105f for attachment in substantially the same manner as illustrated in FIG. 8 and previously described. However, this modification is also adaptable for mounting on an unthreaded axle end such as that shown at 64 in FIG. 7 since the threaded end 116 of the short coupling tube 118 can be merely slipped onto the unthreaded end of an axle of the type shown at 64 in FIG. 7 and such as is shown at 64f in FIG. 15 and a retaining pin 83f can be passed through the aligned holes 81f and 85f, as shown in FIG. 15, which is substantially equivalent to the attachment arrangement illustrated in FIG. 7 and previously described.

The reason that it is possible for the right end 116 of the tube 118 to be attached either to a threaded end 105f of a tricycle axle 64f in the manner shown in FIG. 13 and 14 or to the unthreaded end 79f of a tricycle axle 64f in a manner shown fragmentarily in FIG. 15, is because most conventional tricycle unthreaded axle ends, such as that shown at 79f in FIG. 15, are slightly smaller in diameter than a conventional threaded axle end such as that shown at 105f in FIGS. 13 and 14. This makes it possible to have a universally adaptable connector of the extremely simple type less complicated to construct than those illustrated in any of the previously described forms of the invention.

In connection with the above, it should be noted that when the right end 116 of the tube 118 is threaded onto a threaded tricycle axle end 105f as shown in FIG. 13 and 14, it is normally threaded thereonto fully and then backed off just sufficiently to allow the apertures in the left end 120 of the tube 118 to assume positions such that they are in horizontal alignment so that the pivot pin 95f will be horizontally positioned as is clearly shown in FIG. 13 and 14.

In the case of the attachment of the right end 116 of the tube 118 to an unthreaded tricycle axle end, such as that shown at 79f in FIG. 15, it should be noted that more than two diametrically opposed sets of apertures 81f may be provided so that it will be possible under any condition to align a pair of said apertures 81f with the corresponding conventional cotter pin aperture 85f in the end 79f of the conventional tricycle axle 64f in a manner such that the apertures at the left end 120 of the tube 118 will be horizontally aligned so that the pivot pin 95f will also be horizontally aligned. If desired, it is possible to combine the two types of attachment illustrated in FIGS. 13 and 14 on the one hand and in FIG. 15 on the other hand.

FIG. 16 is a view substantially identical to FIG. 14, but illustrates a modified form of the invention similar to that shown in FIG. 9, wherein the attachment means 73g actually comprises an integral connection of the right end of the tube 118g or, in other words, it may be said that the axle end 79g is merely extended and bored so as to be capable of receiving therein the smaller diameter end of the extension axle 75g which is connected in a manner providing limited vertical pivotal movement so as to effectively comprise vertical pivot pin means 87g functionally equivalent to that shown at 87f in FIGS. 13, 14, and 15.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:
1. An axle extension apparatus for a main wheeled vehicle providing horizontal rigidity and limited vertical flexibility, comprising: an extension axle provided at one end with attachment means cooperable for positive attachment with respect to a main axle of a main wheeled vehicle in a manner such that said extension axle is substantially horizontally transversely aligned and coaxial therewith, said extension axle and said attachment means being provided with vertical pivot means effectively rigid in a horizontal plane but effectively vertically pivotally flexible in a vertical plane within predetermined vertical pivotal movement limits thereby to permit said extension axle to relatively vertically pivot to a predetermined limited extent with respect to such a main axle of such a main wheeled vehicle, said vertical pivot means including structure effectively defining travel-limiting stop means limiting travel at each end of a limited extent of arcuate vertical pivotal movement such that said predetermined limited extent of vertical pivotal movement permitted by said vertical pivot means and said effective stop means will be of a limited magnitude just sufficient to accommodate the type of relative vertical displacement adapted to be encountered when such a main wheeled vehicle and an auxiliary wheeled vehicle adapted to be attached to said extension axle are jointly wheeled over a conventional, substantially flat, firm, underlying ground surface having slight surface irregularities and level variations, said vertical pivot means being of a two-element type wherein one of said elements is connected to said extension axle adjacent to one end thereof and the other of said elements is connected to said attachment means.

2. Apparatus as defined in claim 1, wherein one of said elements of said vertical pivot means comprises a bifurcated yoke means and the other of said elements thereof comprises a tongue means with said tongue means and said bifurcated yoke means being provided with aligned, transversely directed pivot pin mounting means provided with and carrying pivot pin means whereby to provide for relative vertical pivotal movement between said first and second elements of said vertical pivot means and whereby to positively prevent substantial horizontal relative movement thereof.

3. Apparatus as defined in claim 1, wherein said two elements of said vertical pivot means effectively comprise said structure defining said effective stop means, with one of said elements of said vertical pivot means comprising an insertion end and with the other of said elements of said vertical pivot means comprising a receiving recess receiving said insertion end and having a substantially larger inside diameter than the outside diameter of said insertion end and being provided with aligned, transversely directed pivot pin mounting aperture means provided with and carrying therein pivot pin means whereby to provide for relative vertical pivotal movement of said predetermined limited extent between said first and second elements of said vertical pivot means and whereby to positively prevent substantial horizontal relative movement thereof.

4. Apparatus as defined in claim 1, wherein said attachment means comprises an effective coupling member adapted to positively matingly engage an end of such a main axle of such a main wheeled vehicle and provided with retaining engagement means for causing the positive retaining engagement of such an end of such a main axle of such a main wheeled vehicle relative to said coupling member.

5. Apparatus as defined in claim 1, wherein said attachment means comprises a hollow sleeve adapted to receive therein an end of such a main axle of such a main wheeled vehicle and provided with retaining engagement means for causing the positive retaining engagement of such an end of such a main axle of such a main wheeled vehicle within said hollow sleeve.

6. Apparatus as defined in claim 1, wherein said attachment means comprises a hollow sleeve adapted to receive therein an end of such a main axle of such a main wheeled vehicle and transversely provided with locking aperture means and locking pin means adapted to be inserted through said locking aperture means and a corresponding aperture in an end portion of such a main axle of such a main vehicle.

7. Apparatus as defined in claim 1, wherein said attachment means comprises a transversely extending threaded member adapted to be threadedly engaged with respect to a corresponding mating threaded portion of such a main wheeled vehicle in a manner substantially coaxial with respect to a main wheeled axle of such a main vehicle.

8. Apparatus as defined in claim 1, wherein said attachment means comprising a transversely extending, hollow interiorly threaded sleeve member adapted to be threadedly engaged with respect to a corresponding, exteriorly threaded portion of such a main wheeled vehicle in a manner substantially coaxial with respect to such a main axle of such a main wheeled vehicle.

9. Apparatus as defined in claim 1, wherein said extension axle is provided with an auxiliary wheeled vehicle and means attaching said extension axle transversely with respect thereto, and including connection and coupling frame means adapted to be connected between a forward body portion of said auxiliary wheeled vehicle and a rear-positioned rigid frame portion of such a main wheeled vehicle in a horizontally rigid but vertically pivotally flexible manner allowing said relative vertical pivotal movement of said predetermined limited extent and positively causing said auxiliary wheeled vehicle to rigidly maintain a predetermined, longitudinally directed, laterally displaced, substantially parallel relationship with respect to a forward direction of movement of such a main wheeled vehicle.

10. Apparatus as defined in claim 9, wherein said connection and coupling frame means is provided with controllably attachable and detachable connection means for effective connection of said forward body portion of said auxiliary wheeled vehicle in said transversely spaced adjacent relationship with respect to such a main wheeled vehicle and for controllable detachment therefrom when desired.

11. Apparatus as defined in claim 9, wherein said connection and coupling frame means is provided with effective vertical pivot means adjacent to the connection of said connection and coupling frame means with respect to such a main wheeled vehicle and adapted in conjunction with said previously mentioned vertical pivot means carried by said extension axle to allow said auxiliary wheeled vehicle to pivot to a limited vertical extent relative to such a main wheeled vehicle while maintaining a substantially rigid interconnection therebetween in a horizontal plane.

12. Apparatus as defined in claim 9, wherein said extension axle is effectively provided with rear wheel means adapted to be in transversely spaced, horizontally transversely aligned, coaxial and substantially parallel relationship with respect to rear main wheel means carried by such a main axle of such a main wheeled vehicle.

13. Apparatus as defined in claim 1, wherein said attachment means comprises an integral connection thereof with respect to one end of such a main axle of such a main wheeled vehicle.